US008437956B2

(12) United States Patent
Limbaugh et al.

(10) Patent No.: US 8,437,956 B2
(45) Date of Patent: May 7, 2013

(54) UNMANNED AERIAL SYSTEM POSITION REPORTING SYSTEM AND RELATED METHODS

(75) Inventors: Douglas V. Limbaugh, Glendale, AZ (US); David H. Barnhard, Liburn, GA (US); Thomas H. Rychener, Phoenix, AZ (US)

(73) Assignee: Kutta Technologies, Inc., Phoenix, AZ (US)

( * ) Notice: Subject to any disclaimer, the term of this patent is extended or adjusted under 35 U.S.C. 154(b) by 768 days.

(21) Appl. No.: 12/370,480

(22) Filed: Feb. 12, 2009

(65) Prior Publication Data

US 2009/0248287 A1 Oct. 1, 2009

Related U.S. Application Data

(60) Provisional application No. 61/029,094, filed on Feb. 15, 2008.

(51) Int. Cl.
*G01C 21/00* (2006.01)
*G01S 1/00* (2006.01)
*G01S 5/02* (2010.01)

(52) U.S. Cl.
USPC ...... 701/485; 701/2; 701/3; 701/14; 701/120; 701/484; 701/517; 244/189; 244/190; 340/989; 340/992; 340/993; 342/36; 342/463

(58) Field of Classification Search .................. 701/2, 3, 701/11–18, 116, 120–123, 400, 408, 468, 701/484, 485, 514, 517; 244/189, 190; 340/539.13, 340/951, 989, 990–994; 342/36–40, 463–465; 348/113–117
See application file for complete search history.

(56) References Cited

U.S. PATENT DOCUMENTS

| | | | | |
|---|---|---|---|---|
| 3,564,134 | A * | 2/1971 | Rue et al. | 348/39 |
| 5,111,400 | A | 5/1992 | Yoder | |
| 5,574,648 | A | 11/1996 | Pilley | |
| 5,716,032 | A * | 2/1998 | McIngvale | 244/185 |
| 5,890,079 | A | 3/1999 | Levine | |

(Continued)

FOREIGN PATENT DOCUMENTS

EP 1884908 6/2008

OTHER PUBLICATIONS

Hartford, Robin, UAT Puts UAVs on the Radar, www.mitre.orginews/digest/aviation/06 08/av uat.html, Jun. 2008, p. 1-3.

(Continued)

*Primary Examiner* — Jeffrey Shapiro
(74) *Attorney, Agent, or Firm* — Shannon W. Bates; Klemchuk Kubasta LLP

(57) ABSTRACT

Methods of communicating the location of an unmanned aerial system (UAS). Implementations of the method may include receiving position data for a UAS with an air traffic control reporting system (ATC-RS) from a ground control station (GCS) in communication with the UAS, where the ATC-RS and the GCS are coupled together and located on the ground. The method may include transmitting the position data using one or more telecommunication modems included in the ATC-RS to an air traffic control center (ATC) and transmitting the position data using an automatic dependent surveillance broadcast (ADS-B) and traffic information services broadcast (TIS-B) receiver to one or more aircraft.

8 Claims, 8 Drawing Sheets

U.S. PATENT DOCUMENTS

| | | | | |
|---|---|---|---|---|
| 6,147,980 | A | 11/2000 | Yee et al. | |
| 6,173,159 | B1 | 1/2001 | Wright et al. | |
| 6,176,451 | B1 * | 1/2001 | Drymon | 244/3.14 |
| 6,338,011 | B1 | 1/2002 | Furst et al. | |
| 6,677,888 | B2 | 1/2004 | Roy | |
| 6,799,114 | B2 | 9/2004 | Etnyre | |
| 6,806,829 | B2 | 10/2004 | Smith | |
| 6,857,601 | B2 | 2/2005 | Akahori | |
| 6,908,061 | B2 | 6/2005 | Akahori | |
| 6,995,688 | B2 * | 2/2006 | Reynolds | 340/945 |
| 7,130,741 | B2 | 10/2006 | Bodin et al. | |
| 7,228,232 | B2 | 6/2007 | Bodin et al. | |
| 7,269,513 | B2 | 9/2007 | Herwitz | |
| 2002/0075179 | A1 * | 6/2002 | Hudson et al. | 342/30 |
| 2003/0114115 | A1 * | 6/2003 | Overy et al. | 455/73 |
| 2004/0148067 | A1 | 7/2004 | Griffith et al. | |
| 2004/0232285 | A1 | 11/2004 | Akahori | |
| 2005/0200501 | A1 | 9/2005 | Smith | |
| 2006/0032978 | A1 * | 2/2006 | Matos et al. | 244/118.5 |
| 2006/0197700 | A1 * | 9/2006 | Stevens et al. | 342/37 |
| 2006/0253254 | A1 | 11/2006 | Herwitz | |
| 2007/0222665 | A1 * | 9/2007 | Koeneman | 342/29 |
| 2007/0252760 | A1 * | 11/2007 | Smith et al. | 342/451 |
| 2008/0033604 | A1 | 2/2008 | Margolin | |
| 2008/0055149 | A1 | 3/2008 | Rees et al. | |
| 2008/0158041 | A1 * | 7/2008 | Crudeli et al. | 342/36 |
| 2008/0191942 | A1 * | 8/2008 | Smith et al. | 342/456 |
| 2008/0201024 | A1 * | 8/2008 | Matos | 701/2 |
| 2008/0215204 | A1 * | 9/2008 | Roy et al. | 701/28 |
| 2008/0221745 | A1 * | 9/2008 | Diamandis et al. | 701/3 |
| 2008/0243314 | A1 * | 10/2008 | Ridenour | 701/7 |
| 2008/0255711 | A1 * | 10/2008 | Matos | 701/2 |
| 2009/0012657 | A1 * | 1/2009 | Knotts et al. | 701/3 |
| 2009/0222148 | A1 * | 9/2009 | Knotts et al. | 701/2 |
| 2010/0224732 | A1 * | 9/2010 | Olson et al. | 244/190 |
| 2011/0130913 | A1 * | 6/2011 | Duggan et al. | 701/23 |

OTHER PUBLICATIONS

Strain, Robert, A Lightweight, Low-Cost ADS-B System for UAS Applications, Distribution Unlimited Case 07-0634, 2007, p. 1-9.

Strain, Robert, Lightweight Beacon System for UAS and Other Aviation Applications, Mitre Corporation, 2007, p. 1-9.

PCT International Search Report for related PCT/US2009/034088, dated Dec. 14, 2009, 3 pages.

PCT International Preliminary Report on Patentability and Written Opinion of the International Search Authority for related PCT/US2009/034088, dated Aug. 17, 2010, 5 pages.

* cited by examiner

UNMANNED AERIAL SYSTEM POSITION REPORTING SYSTEM AND RELATED METHODS

CROSS REFERENCE TO RELATED APPLICATIONS

This document claims the benefit of the filing date of U.S. Provisional Patent Application 61/029,094, entitled "Unmanned Aerial System Position Reporting Systems and Related Methods" to Limbaugh, et al., which was filed on Feb. 15, 2008, the disclosure of which is hereby incorporated entirely herein by reference.

STATEMENT REGARDING FEDERALLY SPONSORED RESEARCH OR DEVELOPMENT

This invention was made with Government support under Contract FA8750-07-C-0096 awarded by the Air Force. The Government has certain rights in this invention.

BACKGROUND

1. Technical Field

Aspects of this document relate generally to control and position reporting systems for unmanned systems, such as aircraft and vehicles.

2. Background Art

Unmanned systems, particularly aircraft and ground vehicles, perform a wide variety of tasks, including mapping, reconnaissance, range finding, target location, combat, ordinance destruction, and sample collection. The use of ground or water-based unmanned vehicles conventionally involves a remote operator guiding the vehicle while manned vehicles detect the presence of the unmanned vehicle using position tracking systems and methods (visual, radar, sonar). Because of the speed and relatively small size of unmanned aerial systems (UASs) however, the use of visual and/or radar techniques to detect the presence of the UAS may make it difficult for pilots of manned aircraft to avoid a collision. To reduce the risk of collision, many conventional UASs are operated in "sterilized" airspace which has been previously cleared of all manned air traffic by air traffic controllers.

SUMMARY

Implementations of unmanned aerial system position reporting systems may utilize implementations of a first method of communicating the location of an unmanned aerial system (UAS). Implementations of the method may include receiving position data for a UAS with an air traffic control reporting system (ATC-RS) from a ground control station (GCS) in communication with the UAS, where the ATC-RS and the GCS are coupled together and located on the ground. The method may include transmitting the position data using one or more telecommunication modems included in the ATC-RS to an air traffic control center (ATC) and transmitting the position data using an automatic dependent surveillance broadcast (ADS-B) and traffic information services broadcast (TIS-B) receiver to one or more aircraft.

Implementations of first method of communicating the location of a UAS may include one, all, or any of the following:

The method may include receiving a voice signal from an operator of the UAS using the ATC-RS and transmitting the voice signal using the one or more telecommunication modems included in the ATC-RS to the ATC.

The method may include defining a beacon line of sight region using characteristics of the ADS-B and TIS-B transceiver.

The method may include defining a radio frequency line of sight (RFLOS) region using the ATC-RS from characteristics of a radio frequency connection between the GCS and the UAS where the RFLOS region surrounds the ATC-RS.

The method may include defining one or more terrain shadowed regions within the RFLOS region by using the ATC-RS to locate a contour of the one or more terrain based obstructions and to specify that the one or more terrain shadowed regions exist within a predetermined distance from the contour.

The method may further include automatically rerouting the UAS as it enters the one or more terrain shadowed regions.

Implementations of unmanned aerial system position reporting systems may utilize implementations of a second method of communicating the location of a UAS. Implementations of the second method may include defining an RFLOS region surrounding an ATC using the ATC-RS and defining a beacon line of sight region surrounding the ATC-RS using the ATC-RS where the ATC-RS includes an ADS-B and TIS-B transceiver. The method may further include transmitting position information of the UAS located within the RFLOS region to an ATC using one or more telecommunication modems included in the ATC-RS where the position information is generated using position data received from a GCS coupled to the ATC-RS and in communication with the UAS. The method may also include transmitting position information of the UAS using the ADS-B and TIS-B transceiver of the ATC-RS to one or more aircraft located within the beacon line of sight region, where the one or more aircraft include an ADS-B and TIS-B transceiver.

Implementations of a second method of communicating the location of a UAS may include one, all, or any of the following:

Defining the RFLOS region may further include using one or more characteristics of a radio frequency connection between the GCS and the UAS in defining the RFLOS region.

Defining the beacon line of sight region may further include using one or more characteristics of the ADS-B and TIS-B transceiver in defining the beacon line of sight region.

Defining the RFLOS region and defining the beacon line of sight region may further include defining a beacon line of sight region larger than the RFLOS region.

The method may further include transmitting a voice signal from an operator of the UAS received by the ATC-RS using the one or more telecommunication modems.

The method may further include defining one or more terrain shadowed regions within the RFLOS region by locating a contour of one or more terrain based obstructions and specifying that he one or more terrain shadowed regions exist within a predetermined distance from the contour. The method may further include automatically rerouting the UAS as it enters the one or more terrain shadowed regions.

Implementations of unmanned aerial system position reporting systems may utilize implementations of a method of enabling tracking of the position of a UAS using a first ATC and at least a second ATC. Implementations of the method may include establishing a first data connection and a first voice connection with the first ATC using one or more telecommunications modems included in an ATC-RS coupled with a GCS in communication with the UAS, where the ATC-RS and the GCS are located on the ground. The method may include transmitting position information and a voice signal to the first ATC using the first data connection and the first voice connection where the position information is generated using the ATC-RS from position data received by the ATC-RS from the GCS. The method may also include defining at least a first ATC sector and a second ATC sector, where the first ATC is located in the first ATC sector and the second ATC is located in the second ATC sector. The method may also include establishing a second data connection and a second voice connection with the second ATC using the one or more telecommunications modems in response to the UAS entering the ATC transition zone and closing the first data connection and the first voice connection with the first ATC after confirming the existence of the second data connection and the second voice connection with the second ATC.

Implementations of a method of enabling tracking of the position of a UAS using a first ATC and at least a second ATC may include one, all, or any of the following:

Defining an ATC transition zone may further include defining a size of the ATC transition zone using the speed of the UAS and the average time required to make a data connection and a voice connection with an ATC.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended unmanned aerial system (UAS) position reporting system and/or assembly procedures for a UAS position reporting system will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such UAS position reporting systems and implementing components, consistent with the intended operation.

Figure 1:
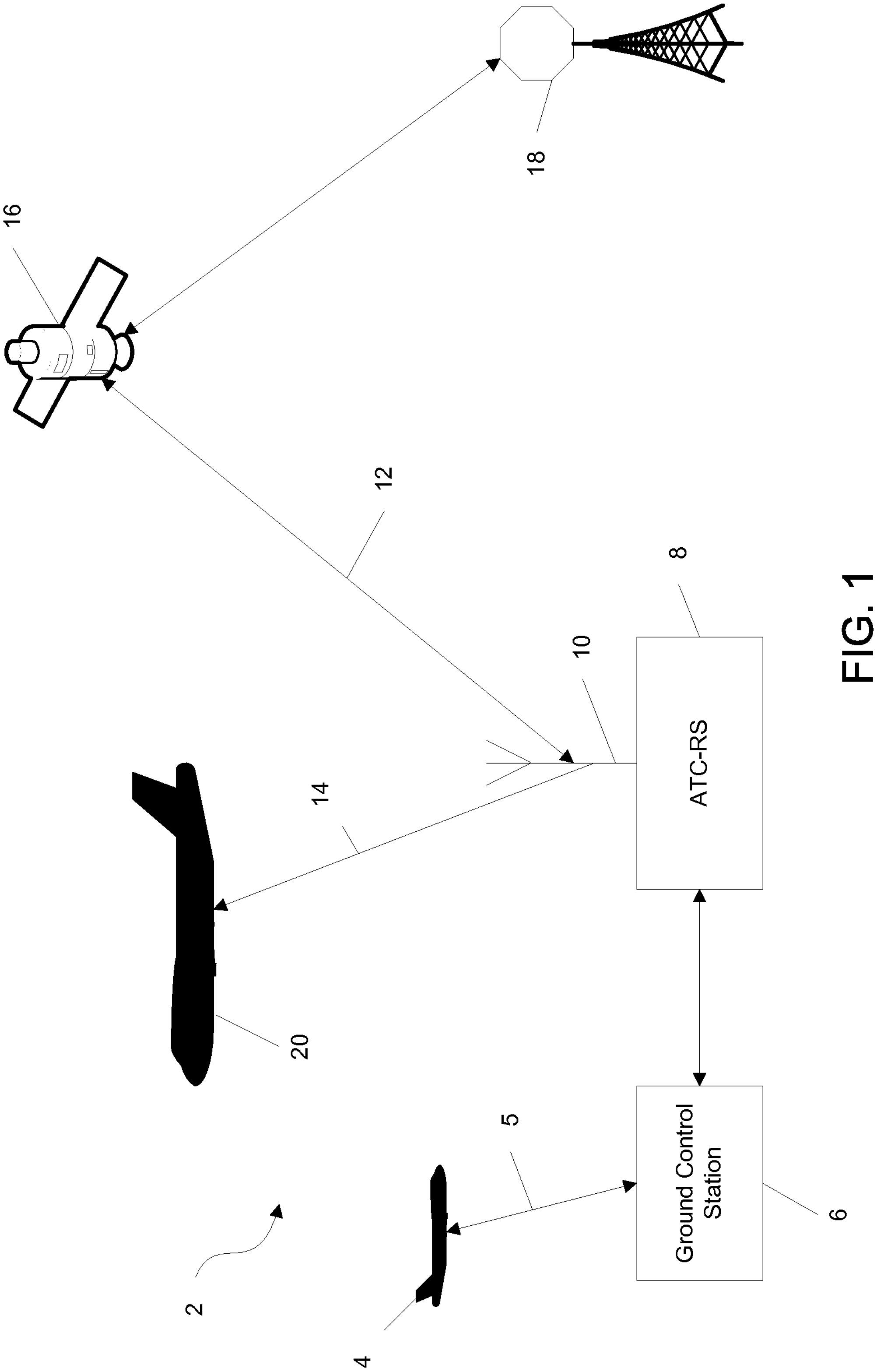
FIG. 1 is a block diagram of an implementation of an unmanned aerial system (UAS) position reporting system.

Referring to FIG. 1, an implementation of a UAS position reporting system 2 is illustrated. As illustrated, the system 2 may include a UAS 4 in radio frequency communication via a radio frequency signal 5 with a ground control station (GCS) 6. The GCS 6 may be used by an operator to control the position and function of the UAS 4 during flight. The GCS 6 is coupled with an air traffic control reporting system (ATC-RS) 8 via any of a wide variety of structures and methods. The ATC-RS 8 is adapted to receive position data from the GCS 6 containing position information about the location of the UAS 4 while airborne (altitude, attitude, geographical coordinates, vector, etc.). The ATC-RS 8 may be adapted in various implementations to process this information and to transmit the position data as position information in various data formats and via various signals. Relevant teachings regarding the structure, use, and operation of implementations of ATC-RS devices may be found in U.S. patent application Ser. No. 12/370,407 to Limbaugh, et al., entitled, "Unmanned Aerial System Position Reporting System," filed Feb. 12, 2009, the disclosure of which is hereby incorporated entirely herein by reference.

As illustrated in FIG. 1, the ATC-RS 8 includes one or more antennas 10 that allow the ATC-RS 8 to transmit one or more telecommunication signals 12 and one or more automatic dependent surveillance broadcast (ADS-B) and traffic information services broadcast (TIS-B) signals 14. The ATC-RS 8 includes one or more telecommunication modems within it adapted to receive and transmit the one or more telecommunications signals 12. The one or more telecommunication modems that may be utilized include, by non-limiting example, a satellite modem, a cellular telephone, a telephone, a wireless fidelity (WIFI) radio device, an Ethernet device, or any other telecommunication device. The ATC-RS 8 also includes an ADS-B and TIS-B transceiver in particular implementations. In particular implementations of UAS position reporting systems 2, the ATC-RS 8 may include any other radio type compatible with a particular position reporting system format or system, whether civilian or military. In these implementations, the ADS-B and TIS-B signals 14 may not actually be formatted in ADS-B and TIS-B format but formatted according to system requirements. Accordingly, all references to ADS-B and TIS-B signals in this document are for the exemplary purposes of this disclosure and are a non-limiting example of a particular implementation of the principles disclosed herein.

As illustrated in FIG. 1, the one or more telecommunications signals 12 may be satellite communication signals and may include a data signal and a voice signal, the data signal carrying position information and the voice signal carrying voice information from the operator of the GCS 6. The one or more telecommunications signals 12 may be received by one or more satellites 16 and transmitted to an air traffic control center (ATC) or command and control (C2) communications center 18. The one or more telecommunications signals 12 may enable the operator of the UAS 4 to be in continuous or substantially continuous voice communication with controllers at the ATC and for the controllers at the ATC to be able to view the position of the UAS 4 at all times. The one or more ADS-B and TIS-B signals 14 may allow the communication of the position of the UAS 4 to all aircraft 20 within the range of the ADS-B and TIS-B transceiver or beacon that likewise have an ADS-B and TIS-B transceiver on board. In this fashion, aircraft that can receive the one or more ADS-B and TIS-B signals may be able to also know where the UAS 4 is and avoid a collision.

Figure 2:
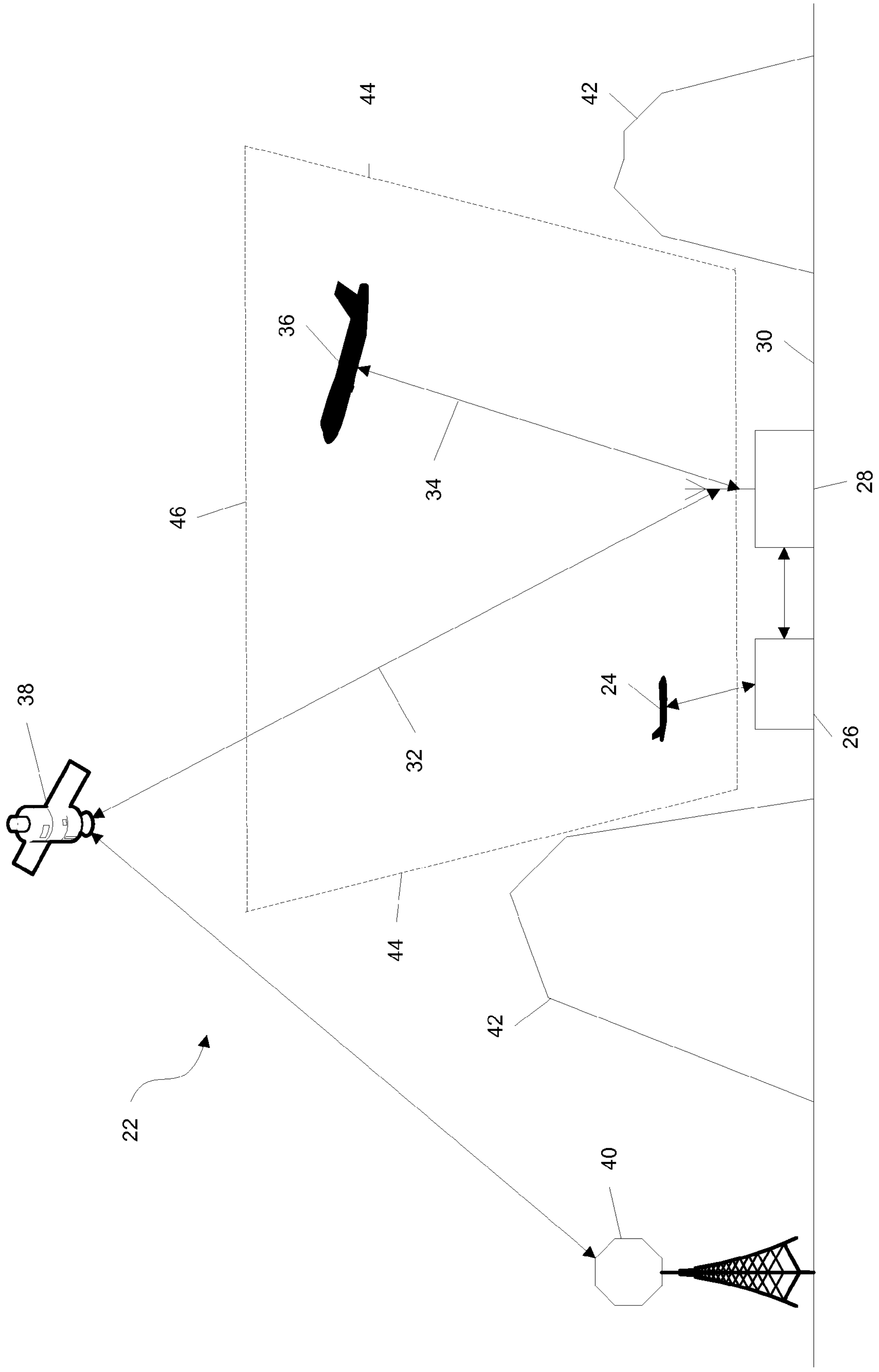
FIG. 2 is a block diagram of an implementation of a UAS position reporting system indicating the extent of a radio frequency line of sight (RFLOS) region.

Referring to FIG. 2 an implementation of a UAS position reporting system 22 is illustrated. As illustrated, the system 22 may include a UAS 24 being controlled by a GCS 26 coupled with an ATC-RS 28 on the ground 30. Like the implementation of a UAS position reporting system 2 previously discussed, the ATC-RS 28 is broadcasting the position of the UAS via one or more telecommunications signals 32 and via an ADS-B and TIS-B signal 34 to aircraft 36 in the vicinity. As illustrated, the one or more telecommunications signals 32 may be satellite signals and be relayed via satellite 38 to ATC or C2 communication center 40, allowing controllers at the ATC 40 to see the position of the UAS 24. In particular implementations, the one or more telecommunications signals 32 may include a voice signal and allow the controllers at the ATC 40 to be in voice communication with the operator of the UAS 24 while being able to view its position.

As illustrated, one or more terrain based obstacles 42 may be present in on the ground in the area around the ATC-RS 28. These one or more terrain based obstructions 42 may be, by non-limiting example, mountains, hills, buildings, vehicles, trees, or any other fixed or semifixed object capable of blocking radio frequency transmissions. Because of the existence of the one or more terrain based obstructions 42, the radio frequency transmissions emanating from the GCS 26 to the UAS 24 and the ADS-B and TIS-B signal 34 will not be received in areas out of sight of the respective antennas of the GCS 26 and the ATC-RS 28. In other words, only those regions within radio signal line of sight of the GCS 26 and the ATC-RS 28 will be able to receive the radio signals. In some implementations, radio line of sight may substantially correspond to visual line of sight and the radio signals may be received only when the GCS 26 and ATC-RS 28 are actually visible; in other implementations, the radio signal line of sight may exceed or be smaller than the visual line of sight. Based on various characteristics of the radio signal and of the antennas and radio used in the GCS 26 and/or in the ATC-RS 28, a two-dimensional and/or three dimensional radio frequency line of sight (RFLOS) region 44 can be defined. Examples of characteristics that may be considered include, by non-limiting example, waveform characteristics (frequency, amplitude, intensity, etc.), power output, antenna data, antenna orientation, interference, noise, and any other parameter or system characteristics affecting the transmission of a radio signal.

As illustrated, using these characteristics, the ATC-RS 28 can calculate the extent of the RFLOS region 44 using a wide variety of algorithms and techniques. Some of these algorithms and techniques will permit the calculating of the RFLOS region 44 to include terrain shadowed regions, which indicate where the terrain based obstructions 42 prevent transmission of the radio signals. In addition, and as illustrated in FIG. 2, these algorithms and techniques may also permit the calculation of an upper bound 46 to the RFLOS region 44, indicating the point where the UAS 24 may fly so high that the radio signals can no longer be received from the GCS 26, or the altitude where aircraft 36 can no longer receive the one or more ADS-B and TIS-B signals 34 from the ATC-RS 28. In particular implementations, the RFLOS region 44 may be referred to as a safe airspace volume (SAV). Any of a wide variety of line of sight algorithms may be employed in calculation of the RFLOS region 44, including, by non-limiting example, U.S. Pat. No. 5,257,405 to Reitberger entitled "Method and System for Setting Up LOS-Radio Communication Between Mobile or Stationary Remote Stations," issued Oct. 26, 1993; and U.S. Pat. No. 7,099,640 to Diao et al., entitled "Method Distinguishing Line of Sight (LOS) from Non-Line of Sight (NLOS) in CDMA Mobile Communication System," issued Aug. 29, 2006, the relevant portions of the disclosures of which are hereby incorporated herein entirely by reference. Additional disclosure regarding the types of and use of radio frequency line of sight and radio range algorithms and calculations may be found in *Reference Data for Radio Engineers*, Howard Sams, International Telephone and Telegraph Corp., New York, 6th Ed. (1981); *Mobile Communications Engineering*, William Lee, McGraw-Hill, New York (1982); and *The ARRL Handbook*, American Radio Relay League, 69th Ed., the relevant disclosures of which are hereby incorporated entirely herein by reference.

Figure 3:
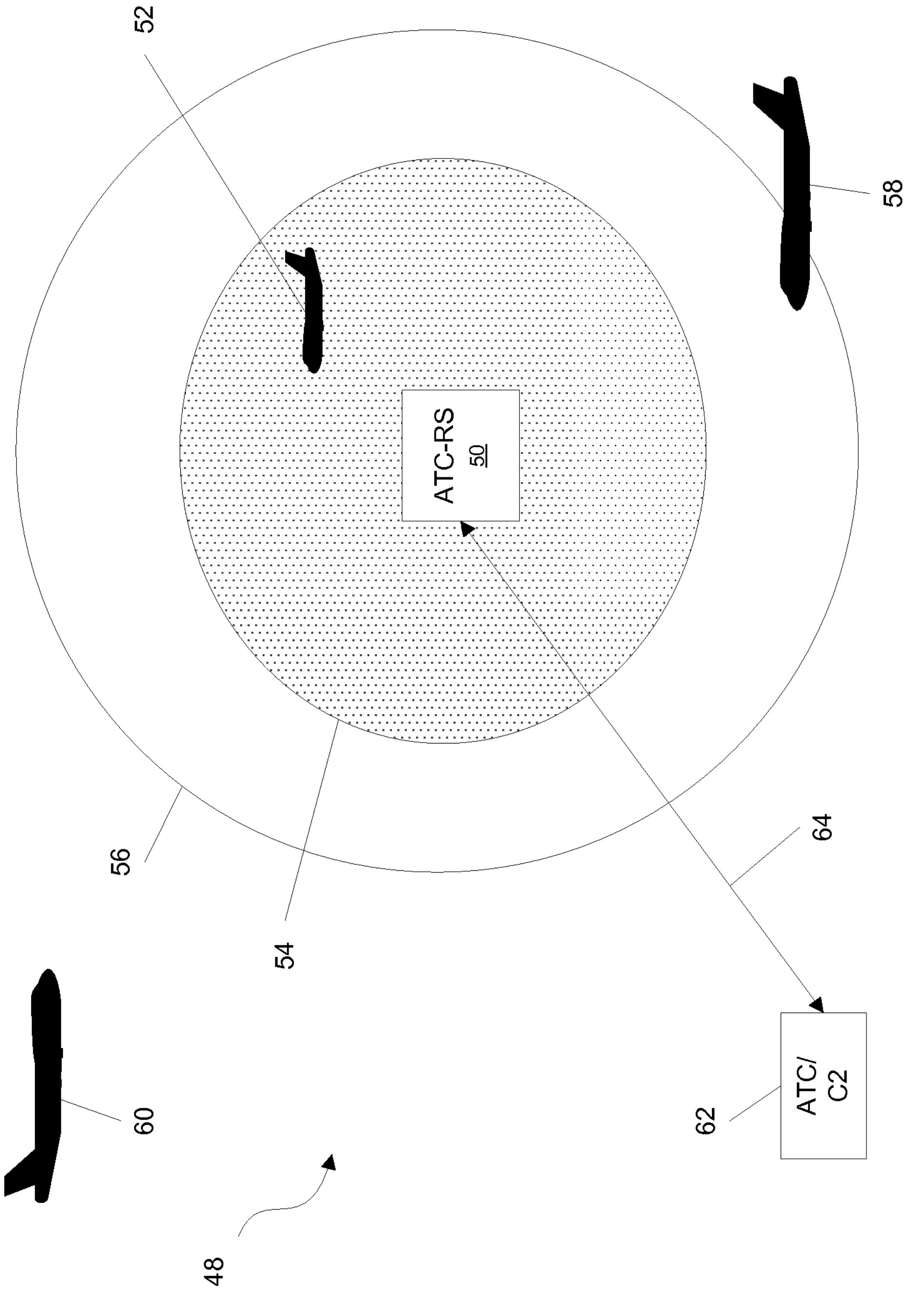
FIG. 3 is a diagram of an implementation of a UAS position reporting system indicating the extent of an RFLOS region and a beacon line of sight region.

Referring to FIG. 3, a top, two-dimensional view of an implementation of a UAS position reporting system 48 is illustrated. As illustrated, the UAS position reporting system 48 includes an ATC-RS 50 coupled with a GCS (not shown) in communication with a UAS 52. In the implementation illustrated in FIG. 3, the ATC-RS 50 has calculated an RFLOS region 54 based on the characteristics of the radio frequency signal between the UAS 52 and the GCS. The ATC-RS 50 has also calculated a beacon line of sight region 56 based on the characteristics of a ADS-B and TIS-B transceiver (or beacon) included in the ATC-RS 50 which is broadcasting UAS position information to various aircraft 58, 60 in the area. The ATC-RS 50 is also in communication with ATC/C2 communication center 62 via one or more telecommunication signals 64.

As illustrated in FIG. 3, in implementations of UAS position reporting systems 48, the beacon line of sight region 56 may be larger than the RFLOS region 54. Because of this, aircraft 58 may be able to receive position information regarding the location of the UAS 52 without actually being within the airspace in which the UAS 52 is flying. In other implementations, the RFLOS region 54 and the beacon line of sight region 56 may be coterminous and the aircraft 58 may, upon receiving position information about the UAS, be simultaneously flying in the airspace in which the UAS may be located. In either case, because of the one or more telecommunication signals 64, aircraft 60, outside the beacon line of sight region 56 and the aircraft 58 within the beacon line of sight region, can be alerted to the location of the UAS 52 by a controller at the ATC/C2 communication center 62. In particular implementations of UAS position reporting systems 48, the ATC/C2 communication center 62 may also be within the beacon line of sight region and, therefore, in communication with the ATC-RS 50 through the ADS-B and TIS-B signals being transmitted by the ATC-RS 50.

Figure 4:
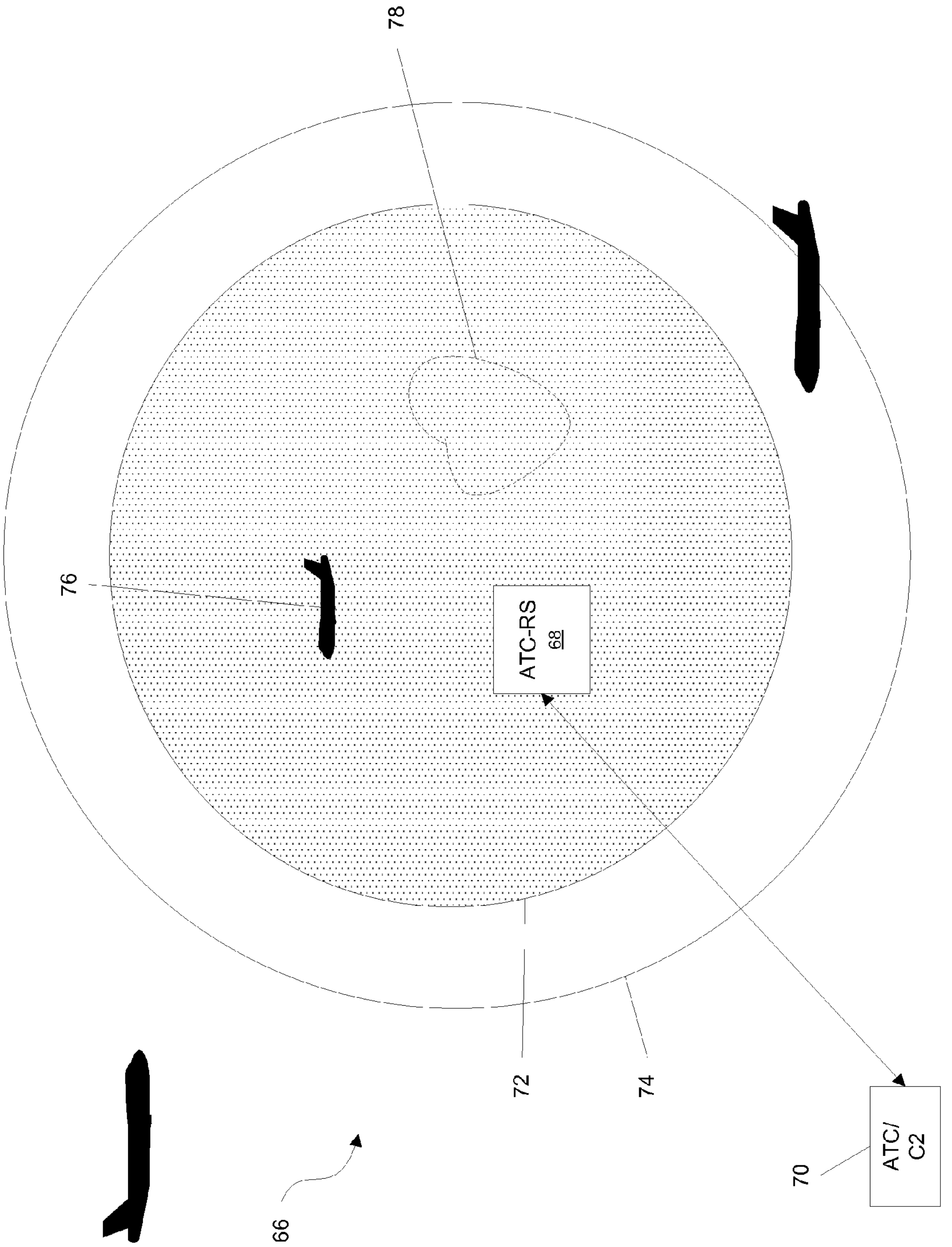
FIG. 4 is a diagram of an implementation of a UAS position reporting system indicating the extent of an RFLOS region and a beacon line of sight region as well as the position of a terrain shadowed region within the RFLOS region.

Referring to FIG. 4, a top, two dimensional view of an implementation of a UAS position reporting system 66 is illustrated. Like the implementation illustrated in FIG. 3, the system 66 includes an ATC-RS 68 in communication with an ATC/C2 communication center 70, an RFLOS region 72, a beacon line of sight region 74, and a UAS 76 in communication with a GCS coupled with the ATC-RS 68. Within the RFLOS region 72, the ATC-RS 68 has determined a terrain shadowed region 78 in which the UAS 76 will be unable to receive radio signals from the GCS. Any of a wide variety of algorithms and methods may be used to calculate the dimensions of terrain shadowed regions 78 that may be used in particular implementations like those disclosed in this document. In particular implementations, the terrain shadowed region 78 may be multilayered, with an outer region and an inner region closer to the obstacle itself. For the exemplary purposes of this disclosure, the dimensions or contour of terrain shadowed region 78 may be determined by the ATC-RS 68 by using the ATC-RS 68 to locate a contour of one or more terrain based obstructions and specifying that the one or more terrain shadowed regions 78 exist within a predetermined distance from the contour. The ATC-RS 68 may receive the contour information from any of a wide variety of sources and systems, including, by non-limiting example, satellite data, contour maps, active radar ranging, radio signal interference patterns, or any other method of determining the location and dimensions of an object. The size of the predetermined distance may be determined by using any of a wide variety of factors, including, by non-limiting example, the size of the UAS 76, the speed of the UAS 76, various performance characteristics of the UAS 76 (turning radius, power, etc.), or any other factor relevant to ensuring the safety of the UAS 76 or other persons or objects.

Once one or more terrain shadowed regions 78 have been identified, implementations of the UAS position reporting system 66 may employ various methods of auto rerouting the UAS 76 to avoid the regions 78, thereby preventing collision of the UAS 76 with the obstacles located within the regions 78. The various methods may include a wide variety of conventional algorithms and techniques for auto rerouting or automatically directing a UAS. An example of such a conventional algorithm may be found in U.S. Pat. No. 7,228,232 to Bodin et al., entitled "Navigating a UAV with Obstacle Avoidance Algorithms," issued Jun. 5, 2007, the disclosure of which is hereby incorporated entirely herein by reference.

Figure 5:
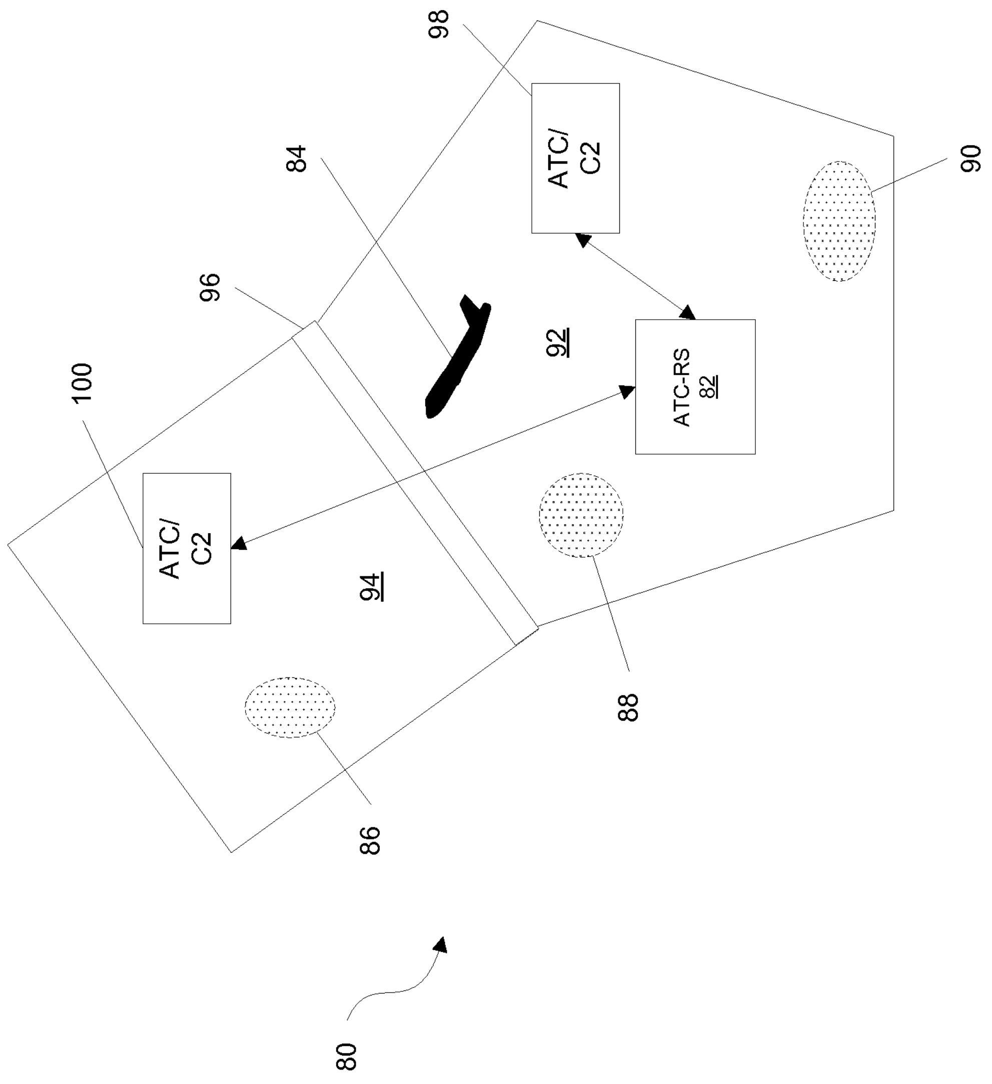
FIG. 5 is a diagram of a first ATC sector including a first ATC and a second ATC sector including a second ATC showing an ATC transition zone.

Implementations of UAS position reporting systems 2, 22, 48, and 66 disclosed in this document may utilize implementations of a method of enabling tracking of the position of an UAS using a first air traffic control center (ATC) and at least a second ATC. Referring to FIG. 5, an implementation of a UAS position reporting system 80 is illustrated. As illustrated, the UAS position reporting system 80 includes an ATC-RS 82 and a UAS 84 in communication with a GCS (not shown) coupled to the ATC-RS 82. As illustrated, the ATC-RS 82 has defined several terrain shadowed regions 86, 88, 90 within a larger RFLOS region. Within the RFLOS region, two air traffic control (ATC) sectors, a first ATC sector 92 and a second ATC sector 94 are defined, with geographic boundaries. Also, an ATC transition zone 96 is included, defined between the first ATC sector 92 and the second ATC sector 94, as part of both the first ATC sector 92 and the second ATC sector 94, or within either the first ATC sector 92 or the second ATC sector 94. Within the first ATC sector 92 is a first ATC/C2 communication center 98 and within the second ATC sector 94 is a second ATC/C2 communication center 100. As illustrated, ATC-RS 82 is located within the first ATC sector 92 and is in communication via one or more telecommunication signals that include a first data connection and first voice connection (capable of transmitting position information and voice signals, respectively) with the first ATC/C2 communication center 98, providing position information of the UAS 84.

As the UAS 84 continues to move toward the second ATC sector 94, it will enter the ATC transition zone 96. When this occurs, the ATC-RS 82 will contact the second ATC/C2 communication center 100 using one or more telecommunication signals while remaining in communication with the first ATC/C2 communication center 98. Once communication has been established or the existence of communication with the second ATC sector 94 setting up a second data connection and a second voice connection has been established, the ATC-RS 82 ends communication with the first ATC/C2 communication center 98. In this way, controllers in an ATC/C2 communication center are always receiving position information and maintaining voice contact with the operator of the UAS 84 at all times until a hand off between the two ATC/C2 communication centers 98, 100 has been accomplished.

Any of a wide variety of factors can be used to calculate the size of the ATC transition zone 96, including, by non-limiting example, the speed of the UAS, the average time required to make a data connection and a voice connection with an ATC or ATC/C2 communication center, the altitude of the UAS, interference effects, or any other parameter affecting safety or the ability of the ATC-RS 82 to make a data connection and voice connection with an ATC.

Figure 6:
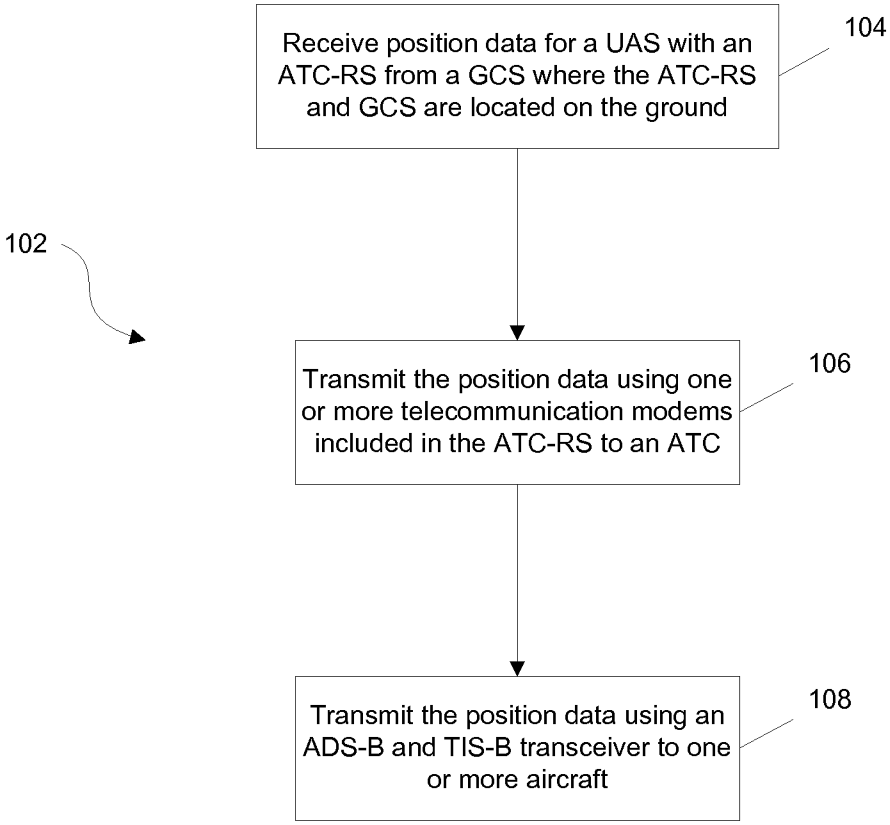
FIG. 6 is a flowchart of an implementation of a first method of communicating the location of a UAS.

Implementations of UAS position reporting systems 2, 22, 48, 66, and 80 disclosed in this document may utilize any of a wide variety of implementations of a first method of communicating the location of a UAS. Referring to FIG. 6, a flowchart of an implementation of a first method of communicating the location of a UAS 102 is illustrated. As illustrated, the method may include receiving position data for a UAS with an ATC-RS from a GCS where the ATC-RS and GCS are located on the ground (step 104). The method 102 may also include transmitting the position data using one or more telecommunication modems included in the ATC-RS to an ATC (step 106) and transmitting the position data using an ADS-B and TIS-B transceiver to one or more aircraft (step 108). Any of the other radio signal types or other radios discussed in this document may also be utilized in implementations of the method 102.

Figure 7:
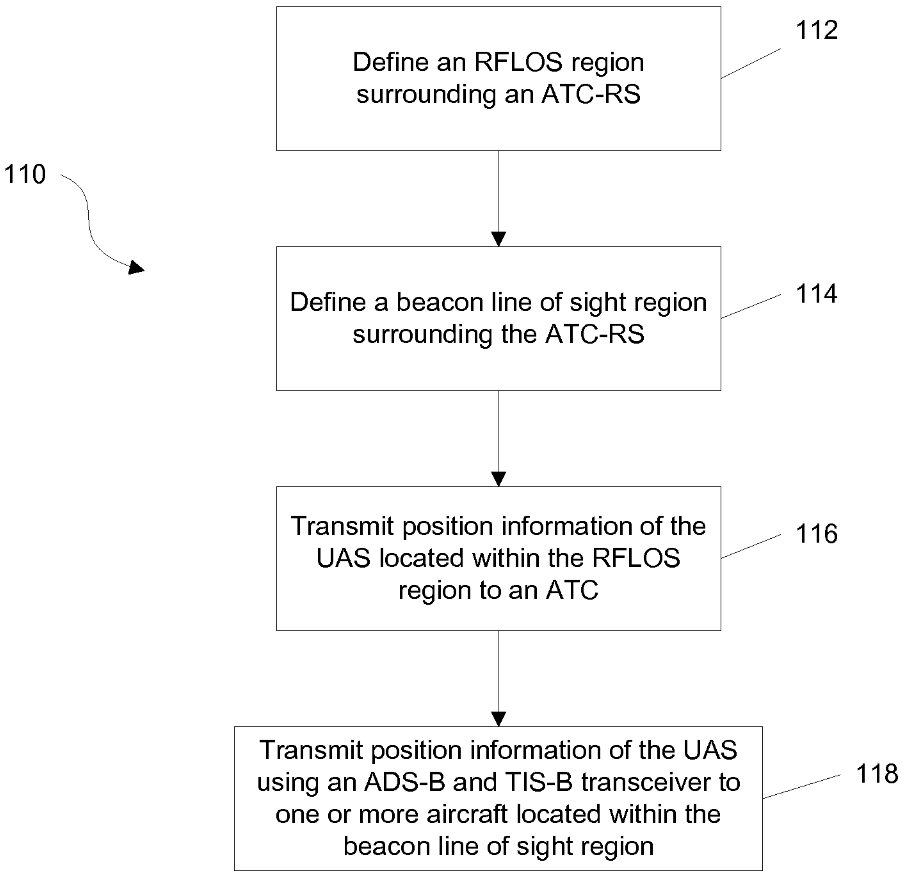
FIG. 7 is a flowchart of an implementation of a second method of communicating the location of a UAS.

Implementations of UAS position reporting systems 2, 22, 48, 66, and 80 disclosed in this document may utilize any of a wide variety of implementations of a second method of communicating the location of a UAS. Referring to FIG. 7, an implementation of the second method 110 is illustrated. As illustrated, implementations of the method 110 may include defining an RFLOS region surrounding an ATC-RS (step 112), defining a beacon line of sight region surrounding the ATC-RS (step 114), transmitting position information of the UAS located within the RFLOS region to an ATC (step 116), and transmitting position information of the UAS using an ADS-B and TIS-B transceiver to one or more aircraft located within the beacon line of sight region (step 118). Any of the other radio signal types or other radios discussed in this document may also be utilized in implementations of the method 110.

Figure 8:
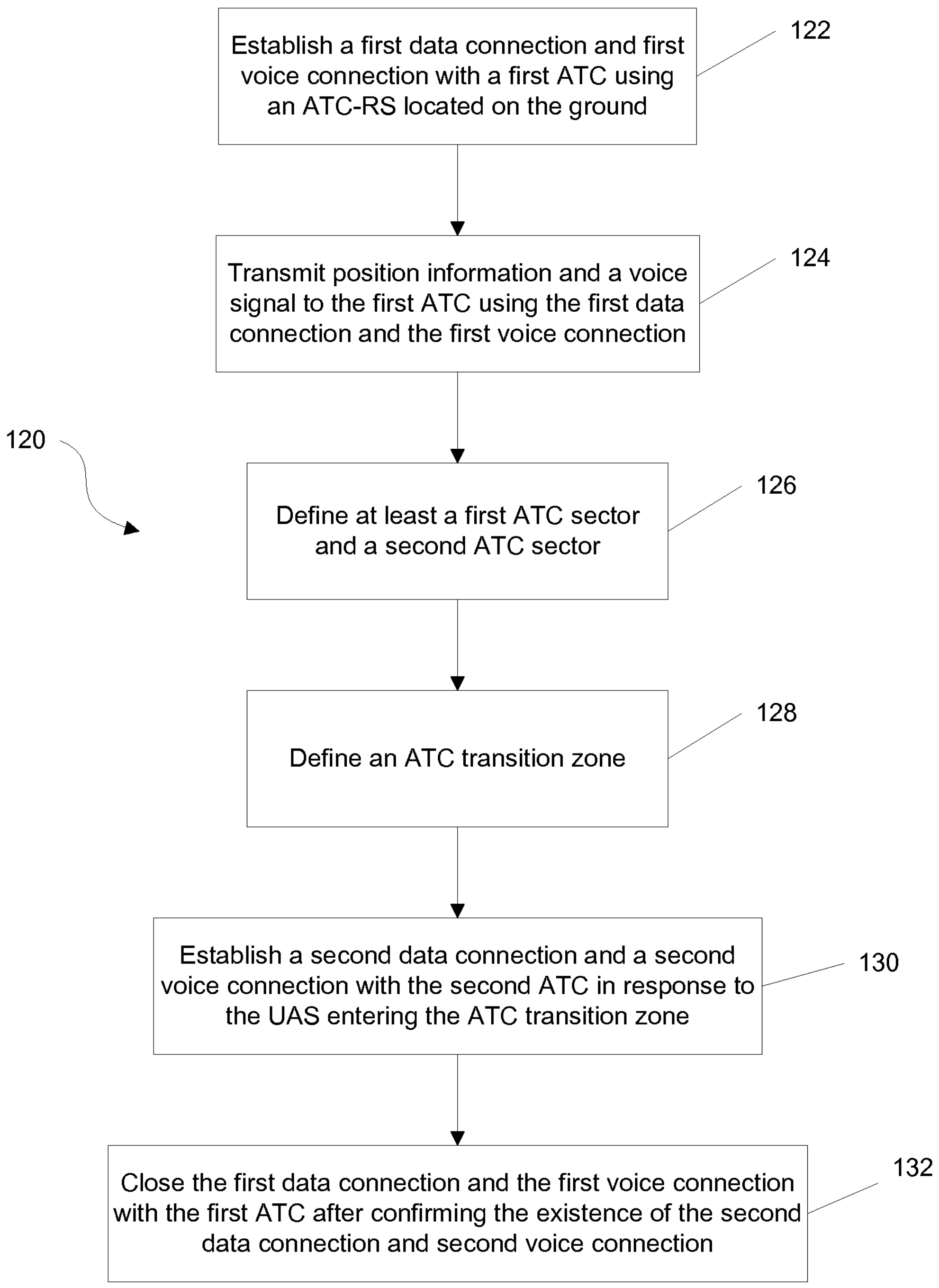
FIG. 8 is a flowchart of an implementation of a method of enabling tracking of the position of a UAS using a first ATC and at least a second ATC.

Implementations of UAS position reporting systems 2, 22, 48, 66, and 80 disclosed in this document may utilize any of a wide variety of implementations of a method of enabling tracking of the position of an unmanned aerial system (UAS) using a first air traffic control center (ATC) and at least a second ATC. Referring to FIG. 8, an implementation of such a method 120 is illustrated. As illustrated, the method 120 may include establishing a first data connection and a first voice connection with a first ATC using an ATC-RS located on the ground (step 122) and transmitting position information and a voice signal to the first ATC using the first data connection and the first voice connection (step 124). The method may also include defining at least a first ATC sector and a second ATC sector (step 126), defining an ATC transition zone (step 128), and establishing a second data connection and a second voice connection with the second ATC in response to the UAS entering the ATC transition zone (step 130). The method may also include closing the first data connection and the first voice connection with the first ATC after confirming the existence of the second data connection and the second voice connection (step 132). Confirming the existence of the second data connection and the second voice connection may include any of a wide variety of confirmation techniques, including, by non-limiting example, an oral exchange, a data exchange, an oral and data exchange, a signal strength test, or any other method or process of verifying the existence and/or reliability of a communication channel.

In places where the description above refers to particular implementations of UAS position reporting systems, it should be readily apparent that a number of modifications may be made without departing from the spirit thereof and that these implementations may be applied to other UAS position reporting systems.

The invention claimed is:

1. A method of communicating the location of an unmanned aerial system (UAS) the method comprising:

defining a radio frequency line of sight (RFLOS) region surrounding an air traffic control reporting system (ATC-RS) using the ATC-RS;

defining a beacon line of sight region surrounding the ATC-RS using the ATC-RS, the ATC-RS including an automatic dependent surveillance broadcast (ADS-B) and traffic information services broadcast (TIS-B) transceiver;

transmitting position information of the UAS located within the RFLOS region to an air traffic control center (ATC) using one or more telecommunication modems included in the ATC-RS the position information generated using position data received from a ground control station (GCS) coupled to the ATC RS and in operational communication with the UAS for guidance during flight; and transmitting position information of the UAS using the ADS B and TIS B transceiver of the ATC RS to one or more aircraft located within the beacon line of sight region the one or more aircraft including an ADS B and TIS B transceiver.

2. The method of claim 1, wherein defining the RFLOS region further comprises using one or more characteristics of a radio frequency connection between the GCS and the UAS in defining the RFLOS region and wherein defining the beacon line of sight region further comprises using one or more characteristics of the ADS-B and TIS-B transceiver in defining the beacon line of sight region.

3. The method of claim 1, wherein defining the RFLOS region and defining the beacon line of sight region further include defining a beacon line of sight region larger than the RFLOS region.

4. The method of claim 1, further comprising transmitting a voice signal from an operator of the UAS received by the ATC-RS using the one or more telecommunication modems.

5. The method of claim 1, further comprising defining one or more terrain shadowed regions within the RFLOS region by locating a contour of one or more terrain based obstructions and specifying that the one or more terrain shadowed regions exist within a predetermined distance from the contour.

6. The method of claim 5, further comprising automatically rerouting the UAS as it enters the one or more terrain shadowed regions.

7. A method of enabling tracking of the position of an unmanned aerial system (UAS) using a first air traffic control (ATC) and at least a second ATC, the method comprising:

establishing a first data connection and a first voice connection with the first ATC using one or more telecommunications modems included in an air traffic control reporting system (ATC-RS) coupled with a ground control station GCS in operational communication with the UAS for guidance during flight, the ATC-RS and the GCS located on the ground;

transmitting position information and a voice signal to the first ATC using the first data connection and the first voice connection, the position information generated using the ATC-RS from position data received by the ATC-RS from the GCS;

defining at least a first ATC sector and a second ATC sector, the first ATC located in the first ATC sector and the second ATC located in the second ATC sector;

defining an ATC transition zone in one of the first ATC sector, the second ATC sector, or in both the first ATC sector and the second ATC sector;

establishing a second data connection and a second voice connection with the second ATC using the one or more telecommunications modems in response to the UAS entering the ATC transition zone; and closing the first data connection and the first voice connection with the first ATC after confirming the existence of the second data connection and the second voice connection with the second ATC.

8. The method of claim 7, wherein defining an ATC transition zone further includes defining size of the ATC transition zone using the speed of the UAS and the average time required to make a data connection and a voice connection with an ATC.

* * * * *